(12) United States Patent
Yelverton

(10) Patent No.: US 6,519,865 B1
(45) Date of Patent: Feb. 18, 2003

(54) FLYWHEEL HOUSING ALIGNMENT TOOL

(75) Inventor: Charles Yelverton, Jackson, MS (US)

(73) Assignee: Broco Tools, L.L.C., Baton Rouge, LA (US)

( * ) Notice: Subject to any disclaimer, the term of this patent is extended or adjusted under 35 U.S.C. 154(b) by 57 days.

(21) Appl. No.: 09/718,012

(22) Filed: Nov. 21, 2000

(51) Int. Cl.[7] .................................................. G01B 5/25
(52) U.S. Cl. .............................. 33/645; 33/533; 33/600
(58) Field of Search ......................... 33/533, 600, 832, 33/833, 542, 545, 613, 626, 638, 642, 645, 605, 606

(56) References Cited

U.S. PATENT DOCUMENTS

| | | | | |
|---|---|---|---|---|
| 2,880,515 A | * | 4/1959 | Vice | 33/644 |
| 3,336,677 A | * | 8/1967 | Newton | 33/638 |
| 4,222,173 A | * | 9/1980 | Hall | 33/180 R |
| 4,473,950 A | * | 10/1984 | Finn et al. | 33/143 L |
| 4,553,331 A | * | 11/1985 | Salaam | 33/172 D |
| 4,554,747 A | * | 11/1985 | Williams | 33/553 |
| 4,578,869 A | * | 4/1986 | O'Brien | 33/181 R |
| 4,982,506 A | * | 1/1991 | Ross | 33/626 |
| 5,639,953 A | * | 6/1997 | Renslow | 73/1.73 |

* cited by examiner

Primary Examiner—Christopher W. Fulton
Assistant Examiner—Tania C. Courson
(74) Attorney, Agent, or Firm—Mark R. Wisner; N. Elton Dry

(57) ABSTRACT

An apparatus and method for aligning a housing such as a flywheel housing with a crankshaft or other rotating member. The apparatus includes a main shaft and a mount by which the main shaft is mounted to the center axis of a member rotating in a housing. A sleeve is received upon and rotates relative to the main shaft and is provided with a mount for a dial indicator. The dial indicator is positioned so that any misalignment between the rotating member and the housing is output by the dial indicator as the sleeve is rotated relative to the housing. Depending upon the output of the dial indicator, the position of the housing is changed relative to the rotating member to align the center axis of the rotating member with the center axis of the housing.

7 Claims, 2 Drawing Sheets

FLYWHEEL HOUSING ALIGNMENT TOOL

BACKGROUND OF THE INVENTION

The present invention relates to an apparatus and method for aligning a housing with a member rotating therein. More specifically, the present invention relates to an apparatus for mounting to a rotating member for centering, or aligning, the rotating member within a housing and a method for using that apparatus for centering the rotating member within the housing.

Certain diesel engines require that the engine and transmission be properly aligned to avoid drivetrain failure. In such drivetrains, the engine and transmission are not directly connected to each other instead, they bolt to an aluminum flywheel housing and the flywheel housing must be precisely aligned to the engine crankshaft. For instance, CUMMINS® and MACK® diesel engine manufacturers require a tolerance of 0.006" at the top, bottom, and side of the flywheel housing.

The current method used to align the flywheel housing to the engine crankshaft utilizes a standard dial indicator with a magnetic base. The magnetic base is attached to the crankshaft which is steel. The dial indicator is positioned to contact the inside mating surface of the flywheel housing where the transmission makes contact. To check alignment, one man must turn the crankshaft from the front of the engine, and must use a large wrench to do so to overcome engine compression. Another man is required at the back of the engine at the flywheel housing to read the dial indicator and make the necessary adjustments to bring the housing in line with the crankshaft. This method requires a great deal of physical exertion and is very time consuming. There is also a chance that the magnetic base will move during alignment such that the alignment is not precise.

There is, therefore, a need for an improved method for aligning a rotating member with the housing in which the member rotates, and it is an object of the present invention to provide such a method.

It is also an object of the present invention to provide an improved apparatus for aligning a rotating member with the housing in which the member rotates.

Another object of the present invention is to provide an apparatus and method for aligning a housing with a member rotating within the housing using a tool with which engine mechanics are familiar, namely, a dial indicator.

Another object of the present invention is to provide a method for aligning a rotating member with the housing in which the member rotates that can be performed by one person.

Yet another object of the present invention is to provide an apparatus and method for aligning a crankshaft with a flywheel housing with improved accuracy.

Other objects, and the advantages, of the present invention will be made clear to those skilled in the art by the following description of the presently preferred embodiments thereof.

SUMMARY OF THE INVENTION

These objects are achieved by providing an apparatus for aligning a housing with a member rotating within the housing with a dial indicator comprising a main shaft, a mount for aligning the main shaft with the center axis of a member that rotates within a housing, and a sleeve that is received upon the main shaft for turning relative to the main shaft. The sleeve comprises a mount to which a dial indicator is mounted, the dial indicator being mounted in a position in which the contact point thereof contacts the housing when the sleeve is turned for outputting a measurement of any misalignment between the housing and the rotating member.

The present invention also provides a method for aligning a housing with a member rotating therein using a dial indicator comprising the steps of mounting a main shaft on a member rotating within a housing in alignment with the center axis of the rotating member, rotating a sleeve having a dial indicator mounted thereto on the main shaft with the contact point of the dial indicator in contact with the housing, and adjusting the position of the housing relative to the center axis of the rotating member until the dial indicator outputs a measurement indicating acceptable alignment between the housing and the center axis of the rotating member.

DETAILED DESCRIPTION OF THE PREFERRED EMBODIMENT

Figure 1:
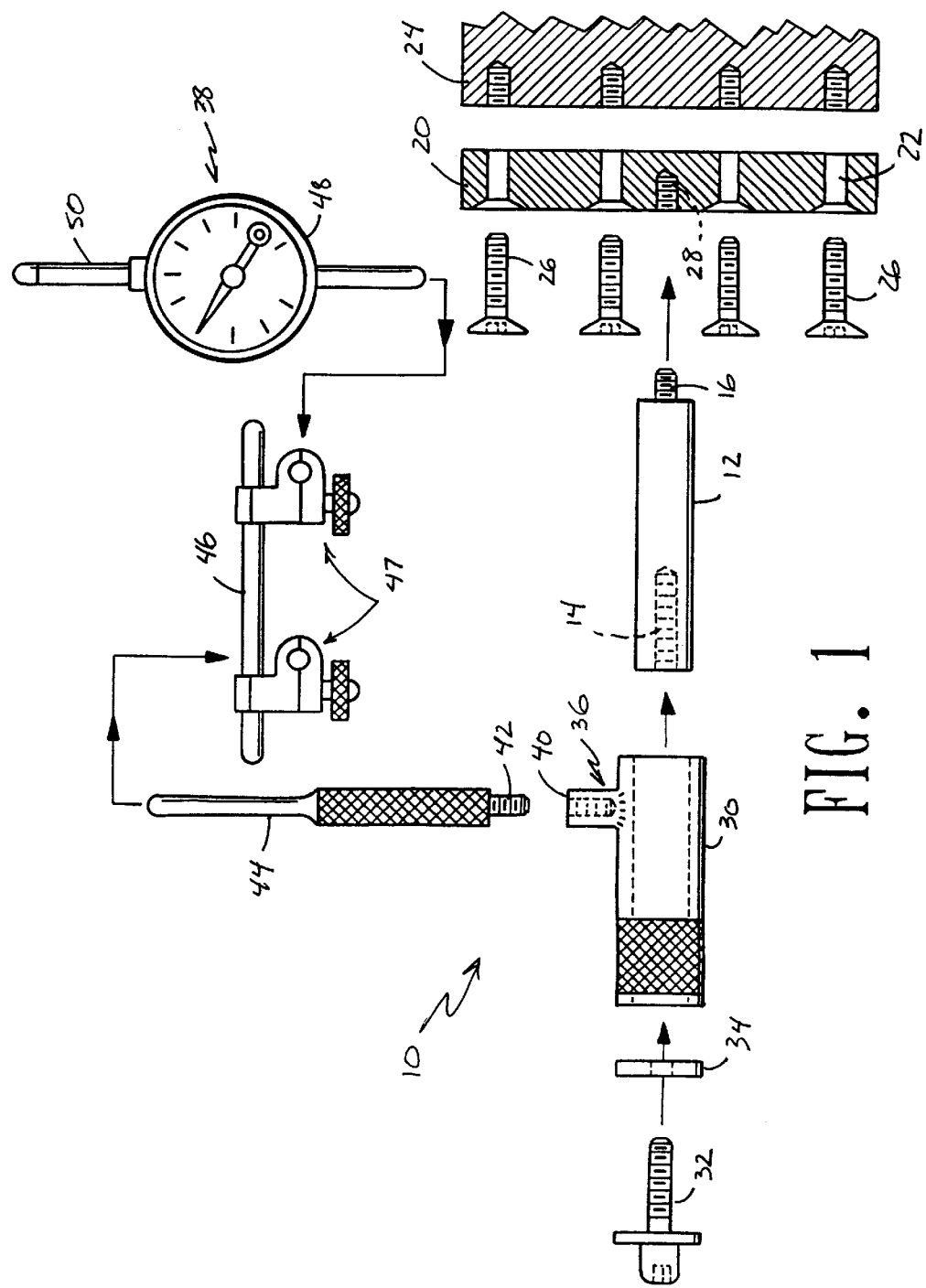
FIG. 1 is an exploded, diagramatic view of a preferred embodiment of an apparatus for aligning a housing with a rotating member constructed in accordance with the teachings of the present invention.
Figure 2:
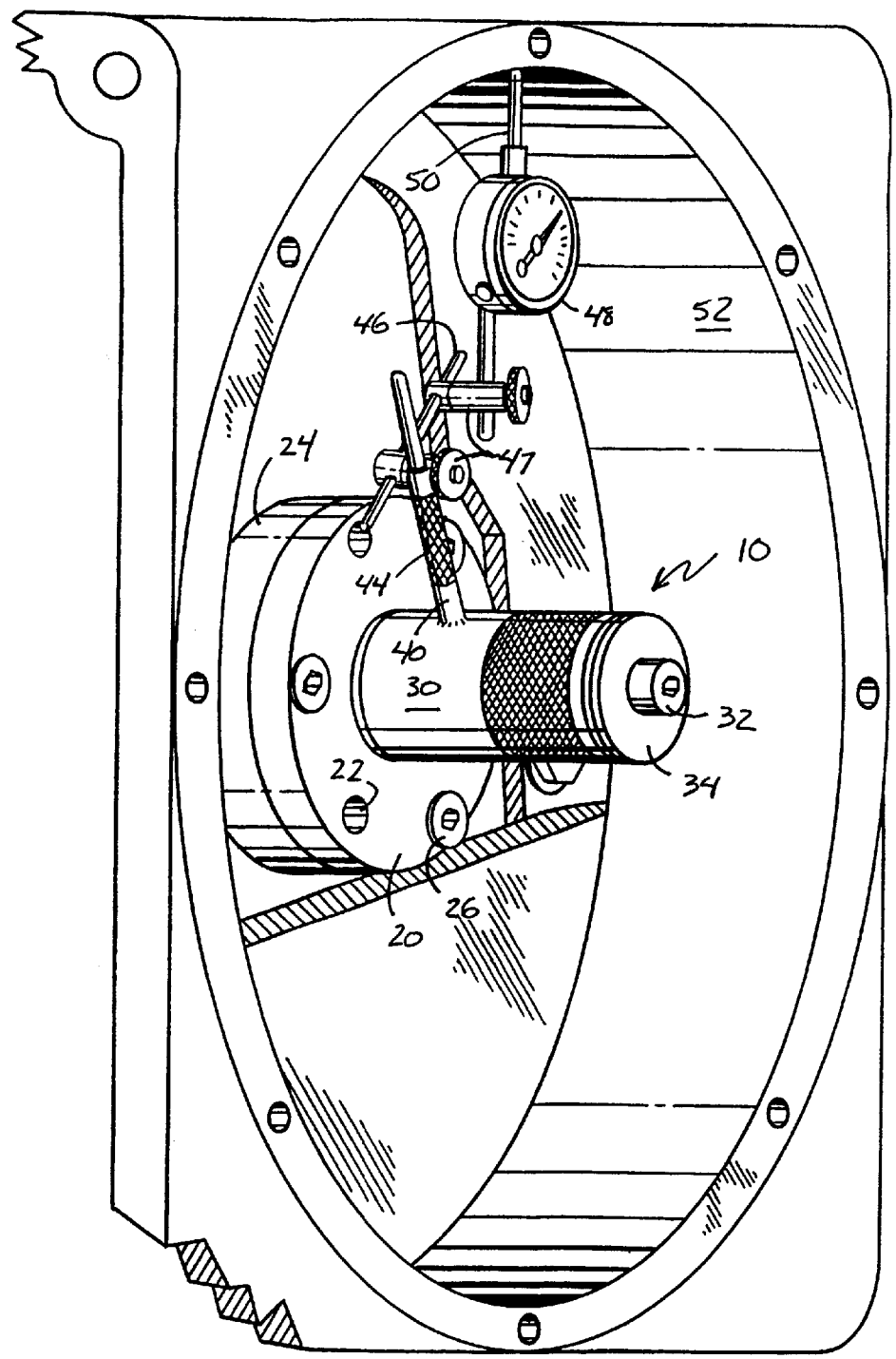
FIG. 2 is a perspective view of the apparatus of FIG. 1 mounted to the engine crankshaft of a diesel engine.

Referring to FIGS. 1 and 2, a preferred embodiment of a flywheel housing alignment tool constructed in accordance with the teachings of the present invention is indicated generally at reference numeral 10. The apparatus 10 comprises a main shaft 12 (not visible in FIG. 2) having a threaded hole 14 at one end for a purpose set out below and a threaded stud 16 at the other end. In an alternative embodiment, the main shaft 12 is provided with a flange (not shown) for stabilizing the shaft when the threaded stud 16 is screwed into the mount to the engine crankshaft 24 and the shaft 12 is provided with wrench flats, a knurled surface (neither of which is shown in FIG. 1), or other structure for facilitating the tightening of the shaft 12 to the mount. The mount takes the form of a plate 20 having a plurality of holes 22 therethrough, the holes 22 being arranged on plate 20 to coincide with the locations of the holes (not visible in the figures) in an engine crankshaft 24. Each of the holes 22 is preferably tapered for receiving a corresponding bevel-headed bolt 26 so that the plate 20 is self-aligning with the center axis of the rotating crankshaft 24. Plate 20 is also provided with a threaded hole 28 at the center axis thereof for receiving the threaded stud 16 of main shaft 12, thereby aligning the longitudinal axis of the main shaft 12 with the center axis of crankshaft 24.

The alignment apparatus 10 also comprises a sleeve 30 received on and sized to fit closely over main shaft 12. Although not required for the function of the present invention, a tension bolt 32 is preferably threaded into the above-described hole 14 in the main shaft 12 for retaining the sleeve 30 on main shaft 12. When retained on main shaft 12 in this manner, sleeve 30 rotates, or turns, relative to main shaft 12. A tension washer 34 may be provided for frictionally engaging the end of sleeve 30 to resist undesired rotation of the sleeve relative to main shaft 12.

Sleeve 30 is provided with a mount, indicated generally at reference numeral 36, for a dial indicator 38. In the presently preferred embodiment shown in the figures, mount 36 comprises a threaded nipple 40 integrally formed with sleeve 30.

Nipple 40 receives the threads 42 of a dial indicator stand 44 to which a mounting rod 46 is mounted by a swivel joint with a thumbscrew 47 of a type known in the art. The gauge 48 and contact point 50 of dial indicator 38 are likewise mounted to mounting, rod 46 by a swivel joint and thumbscrew 47.

As best shown in FIG. 2, to use the alignment apparatus 10, the plate 20 is mounted to the crankshaft 24 of an internal combustion engine and the sleeve 30 is tightened in place over the main shaft with nut 32. The dial stand 44 is tightened into the nipple 40 on sleeve 30 and the mounting rod 46 is positioned (using the swivel joints 47) until the contact point 50 of dial indicator 38 contacts the flywheel housing .52. The sleeve 30 is then turned on main shaft 12, the contact point 50 outputting a measurement of any misalignment between housing 52 and sleeve 30 on the gauge 48. Because the rotating sleeve 30 is aligned with the center axis of the rotating crankshaft 24 through main shaft 12, the measurement output by gauge 48 is likewise indicative of any misalignment between crankshaft 24 and housing 52.

Those skilled in the art who have the benefit of this disclosure will recognize that certain changes can be made to the component parts of the apparatus of the present invention without changing the manner in which those parts function to achieve their intended result. For instance, in referring to the plate 20, it is intended to refer to any means for mounting the main shaft 12 to the crankshaft of a rotating member, whether it is mounted by the bolts and threads described herein, pins, magnetically, or by any other means. For this reason, the plate 20 and its attendant parts are referred to herein as being the component parts of a mount for main shaft 12. Similarly, main shaft 12 need not be threaded into the hole 28 in mounting plate 20; main shaft 12 could, for instance, be formed integrally with a spider for clipping to the periphery of plate 20. All such changes, and others which will be clear to those skilled in the art from this description of the preferred embodiments of the invention, are intended to fall within the scope of the following, non-limiting claims.

What is claimed is:

1. Apparatus for aligning the center axis of a rotating member with a housing using a dial indicator having a contact point comprising:

a main shaft;

a mount for aligning the main shaft with the center axis of the rotating member within the housing; and a sleeve received upon said main shaft for turning relative to said main shaft and having a mount formed thereon to which the dial indicator is mounted, the dial indicator being mounted to said sleeve in a position in which the contact point thereof contacts the housing when the sleeve is turned on said main shaft for outputting a measurement of any misalignment between the housing and the rotating member.

2. The apparatus of claim 1 wherein said mount comprises a plate mounted to the rotating member having a hole therein for receiving one end of said main shaft.

3. The apparatus of claim 1 additionally comprising means for retaining said sleeve on said main shaft.

4. The apparatus of claim 1 additionally comprising a member received on said main shaft for frictionally engaging said sleeve to resist undesired rotation of said sleeve relative to said main shaft.

5. The apparatus of claim 4 wherein said frictional engagement member comprises a tension bolt received within said main shaft and a tension washer for contacting said sleeve when said tension bolt is tightened.

6. A method for aligning a housing with a member rotating therein using a dial indicator having a contact point comprising the steps of:

mounting a main shaft on the member rotating within the housing in alignment with the center axis of the rotating member;

rotating a sleeve having the dial indicator mounted thereto on the main shaft with the contact point of the dial indicator in contact with the housing; and adjusting the position of the housing relative to the center axis of the rotating member until the dial indicator outputs a measurement indicating an acceptable alignment between the housing and the rotating member.

7. The method of claim 6 additionally comprising resisting rotation of the sleeve on the main shaft.

* * * * *